United States Patent [19]

Malissin et al.

[11] Patent Number: 4,570,249
[45] Date of Patent: Feb. 11, 1986

[54] OPTICAL READ/WRITE HEAD FOR RECORDING AND PLAYBACK OF AN OPTICAL DISK AND AN OPTICAL DEVICE ASSOCIATED WITH SAID OPTICAL HEAD

[75] Inventors: Roland Malissin; Claude Monlouis, both of Paris, France

[73] Assignee: Thomson CSF, Paris, France

[21] Appl. No.: 468,597

[22] Filed: Feb. 22, 1983

[30] Foreign Application Priority Data

Mar. 2, 1982 [FR] France ................. 82 03426

[51] Int. Cl.⁴ ............................................. G11B 7/12
[52] U.S. Cl. ...................... 369/45; 369/44; 369/111; 369/249; 369/219
[58] Field of Search ............. 369/44, 45, 111, 215, 369/219, 220, 221, 244, 249; 350/252, 255; 250/201 DF, 202

[56] References Cited

U.S. PATENT DOCUMENTS

| 3,969,574 | 7/1976 | Jonssen | 369/111 |
|---|---|---|---|
| 4,193,091 | 3/1980 | Klevters | 369/44 |
| 4,236,232 | 11/1980 | Jonsen | 369/44 |
| 4,239,942 | 12/1980 | Van Alem | 369/44 |
| 4,321,701 | 3/1982 | Arquie | 369/45 |
| 4,367,543 | 1/1983 | Araki | 369/45 |
| 4,394,755 | 7/1983 | Gijzen | 369/44 |
| 4,403,316 | 9/1983 | Veerdonk | 369/44 |
| 4,414,657 | 11/1983 | Arquie | 369/45 |
| 4,449,213 | 5/1984 | Noborimoto | 369/44 |
| 4,462,096 | 7/1984 | Kusaka | 369/45 |

FOREIGN PATENT DOCUMENTS

| 2944776 | 5/1981 | Fed. Rep. of Germany | 369/111 |
|---|---|---|---|
| 586445 | 3/1977 | Switzerland | 369/44 |
| 2029051 | 3/1980 | United Kingdom | 369/44 |
| 2077479 | 12/1981 | United Kingdom | 369/44 |

Primary Examiner—Alan Faber
Attorney, Agent, or Firm—Cushman, Darby & Cushman

[57] ABSTRACT

An optical head is provided for writing and reading a disk by means of at least one focused beam, the disk being provided with at least one track having uniformly spaced grooves. The optical head makes use of a motor comprising a fixed magnetic circuit provided with at least one air-gap in which a moving system is capable of displacement and is also provided with an access and radial tracking magnetic circuit including at least one core which is secant with all the grooves. The moving system is constituted by two actuators, the first actuator being intended to permit access and radial tracking while the second actuator permits focusing of the light beam on the track, the two actuators being coupled by flexible attachment means. Guiding means comprising magnetic elements permit lifting of the access and radial tracking actuator with respect to the core of its magnetic circuit.

14 Claims, 18 Drawing Figures

OPTICAL READ/WRITE HEAD FOR RECORDING AND PLAYBACK OF AN OPTICAL DISK AND AN OPTICAL DEVICE ASSOCIATED WITH SAID OPTICAL HEAD

FIELD OF THE INVENTION

This invention relates to the field of recording of data on carriers which can be read optically by means of a focused beam of radiation and is more particularly concerned with an optical read/write head for an optical disk and with an optical device associated with a head of this type.

BACKGROUND OF THE INVENTION

In the case of writing and/or reading of a disk of the optical type, it is necessary:

to gain access to one zone of the disk, to remain in said zone with good precision both radially and perpendicularly to the surface of the disk (focusing).

In devices of the prior art, an "optical head" satisfies both of the functions just mentioned and is usually composed of an actuator or motor of the so-called "loudspeaker voice coil" type which permits focusing motion at right angles to the face of the disk. The optical head also comprises an actuator which serves to carry out the radial tracking motion and consists either of an oscillating mirror or of a translational-motion device which can be fixed in the moving portion of the focusing actuator.

In regard to access, this is obtained by displacing the entire "optical head" either by means of a system consisting of a screw and direct-current motor or stepping motor or by means of a motor and belt system. The linear motor technique employed in certain types of magnetic disks may also be adopted.

It is an advantage to have the possibility of employing the access actuator for carrying out radial tracking at least to a partial extent while maintaining a small overall size of actuator as well as a low value of control power.

"Optical heads" in standard use comprise one or a number of magnetic circuits for permitting focusing and radial tracking movements. This results, however, in heads on relatively substantial weight (of the order of 20 to 40 g).

Should it be desired to obtain at least partial correction of radial tracking with the access actuator, this latter can undoubtedly be only of the linear motor type. The weight of the optical head governs the dimensions and weight of the access linear motor, and consequently the control power of the access actuator.

SUMMARY OF THE INVENTION

In order to minimize the dimensions and consequently the control power of the access actuator as well, it appears necessary to reduce the weight of the "optical head". One solution consists in stationarily fixing the magnetic circuits of the "optical head" and therefore in associating with the moving objective lens only coils which interact with a fixed field.

However, two coils appear to be redundant: on the one hand, the coil of the access actuator which permits access and partial correction of tracking errors and, on the other hand, the coil of the radial tracking actuator. To this end, the invention first consists in suppressing the tracking coil, in which case both the access function and the radial tracking function are assigned to the access coil.

A device of this type has operational capability but its performances are limited by the solid and essentially non-linear friction introduced by the guiding of the access coil, whether guiding is performed by rolling means (rollers or ball-bearings) or by means for displacement in simple sliding motion.

When guiding is effected either by rolling or by friction and directly on the central magnetic core, a device of this type makes it possible to obtain a tracking accuracy on the order of a few micrometers. In a disk of the optical type, however, the accuracy required is on the order of 0.1 micrometer.

Thus a device of the prior art as described in European patent Application published under No. 0 012 650, and corresponding to U.S. Pat. No. 4,321,701, relates to a device for vertical position control and radial position control by displacement of a moving system of very small weight, these two control systems being controlled by currents which are proportional to the displacements to be obtained. To this end, conductive elements through which the control currents pass are placed in a fixed magnetic field at right angles to the radius and extend over the entire useful length of the radius of the disk and move in this magnetic field, the reading objective being rigidly fixed to these moving elements.

However, this type of the prior art device is provided with parts slidably mounted within the air-gap of its magnetic circuit and is therefore subject to the limitations described above and related to the solid friction.

Thus the correct operation of a composite access and tracking device is essentially related to the guidance principle. Thus the guiding device is the primary object of the invention and makes it possible to overcome the major disadvantage of the prior art discussed in the foregoing. In the device according to the invention, the repulsion between two magnetic fields is utilized in order to carry out guiding by sustentation or lifting of the optical head.

Moreover, in addition to the mechanical advantages offered in accordance with expectations, fixing of the focusing actuator on the radial actuator makes it possible to avoid certain optical reaction defects which are inherent in conventional optical heads. In fact, whether the system employed is equipped with an oscillating radial mirror or with a translational-motion radial actuator fixed on the focusing actuator, there is no way of completely dispensing with the need for a displacement of the optical beam which results either in a diaphragm effect of the objective lens pupil or in displacement or deformation of the return optical spot.

On the contrary, in the case of a focusing actuator fixed on the radial tracking actuator, these effects are non-existent and it is possible to make use of a radial tracking sensor system of the "push-pull" type, for example.

The invention relates to a read/write optical head for recording and playback of a disk by means of at least one focused beam of radiation, said disk being provided with at least one track having uniformly spaced grooves. The optical head makes use of a motor comprising a fixed magnetic circuit provided with at least one airgap in which a moving system is capable of displacement and also provided with an access and radial tracking magnetic circuit including at least one core which is secant with all the grooves. The moving system comprises actuators for gaining access to the track, for radial tracking and for focusing the radiation on said track, and a focusing objective lens. Said moving system is constituted by two actuators, the first actuator being intended to permit access and radial tracking while the second actuator permits focusing of the light beam on said track, the two actuators being coupled by attachment means. The first actuator comprises at least one access and radial tracking coil and the second actuator is constituted by a focusing coil. Means for guiding the first actuator permit magnetic lifting of said access and radial tracking actuator with respect to each core of the magnetic access and radial tracking circuit.

The invention is further directed to an optical device associated with a head of this type.

BRIEF DESCRIPTION OF THE DRAWINGS

Other features of the invention will be more apparent to those versed in the art upon consideration of the following description and accompanying drawings, wherein.

DETAILED DESCRIPTION OF THE INVENTION

Thus in order to minimize the dimensions and consequently also the control power of the access actuator, an improvement with respect to the optical heads includes reducing the weight of the "optical head" by fixing the magnetic circuits of the optical head in a stationary position and associating with the movable objective only magnetic coils which interact with a fixed field. A system of this type is described with reference to FIGS. 1 and 2 in which one possible type of construction is illustrated diagrammatically.

Figure 1:
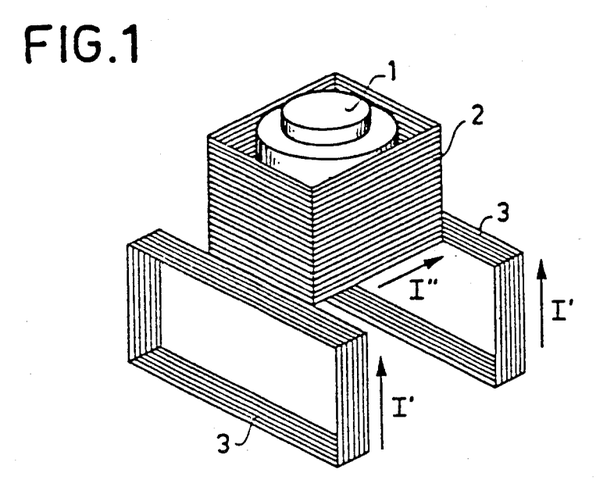
FIGS. 1 and 2 are diagrammatic views of a lightweight optical head provided with three actuators.

FIG. 1 illustrates a view in perspective of a movable focusing head for access and radial tracking. The objective lens is designated by the reference numeral 1, the focusing coil is designated by the reference numeral 2 and the radial tracking coil is designated by the reference numeral 3. A current I″ passes through the focusing coil 2 and a current I′ passes through the radial tracking coil 3.

Figure 2:
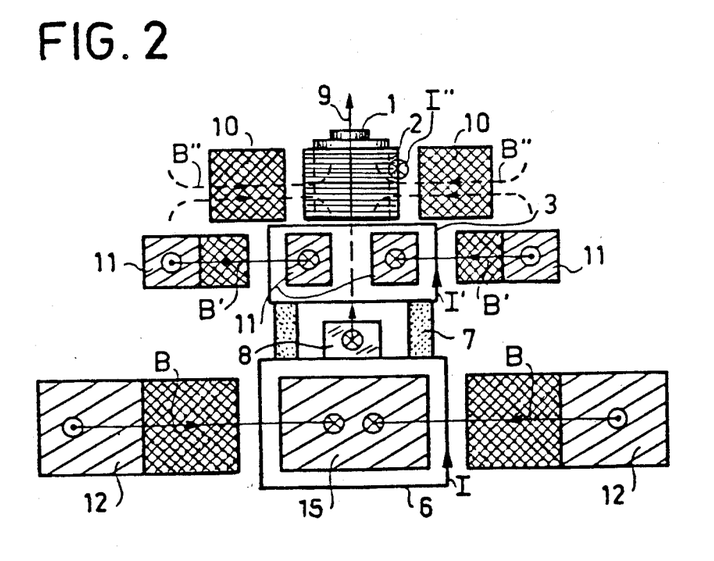

The same assembly appears again in FIG. 2 which shows the third coil, namely the access coil 6 through which a current I passes.

An attachment which is flexible both radially and in the focusing direction serves to couple the pair of coils 2, 3 and the objective lens 1 to the access coil 6.

The magnetic circuit of the linear access motor is designated by the reference 12. This circuit is a fixed magnetic assembly which is closed at both ends. Said assembly comprises a central core 15 with the directions of the magnetic field B.

In this figure and in the following figures, the hatched portions represent the pole-pieces and the cross-hatched portions represent the magnets.

The radial magnetic circuit is designated by the reference numeral 11 and the focusing magnet is designated by the reference numeral 10.

The reference numeral 8 designates the deviating mirror from which the light beam 9 is reflected, said beam being focused on the data carrier by the objective lens 1.

As shown in FIG. 2, preference is given to the use of two magnetic fields B′ and B″ having the same directions.

However, two coils appear to be redundant: on the one hand, the coil 6 of the access actuator which permits access and partial correction of the tracking error and, on the other hand, the coil 3 of the radial tracking actuator. Furthermore, a device of this type appears complicated to construct and therefore of little interest. Hence one great advantage of the invention consists of dispensing with the tracking coil 3, the two functions of access and radial tracking being accordingly assigned to the access coil 6.

The system is composed of a radial and access actuator on which the focusing actuator is fixed. All the magnetic circuits are fixed and have length which is slightly greater than the useful radial length of the disk. The moving elements are limited to the optical components (basically the objective lens) and to the actuator coils. The two basic magnetic circuits are described with reference to FIG. 3 and the figures that follow.

Figure 3:
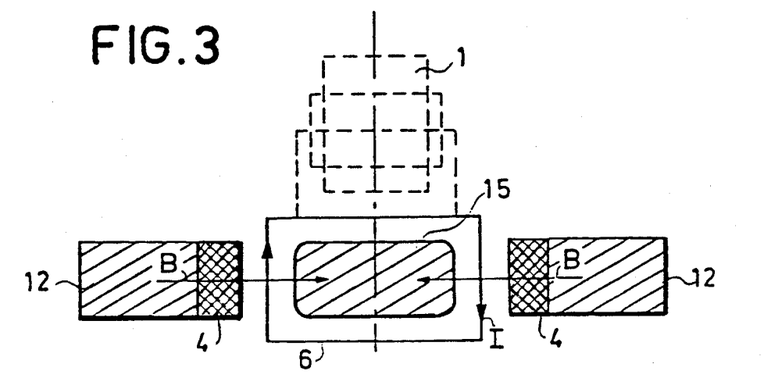
FIGS. 3 to 5 illustrate different aspects of an optical head in accordance with the invention.
Figure 4:
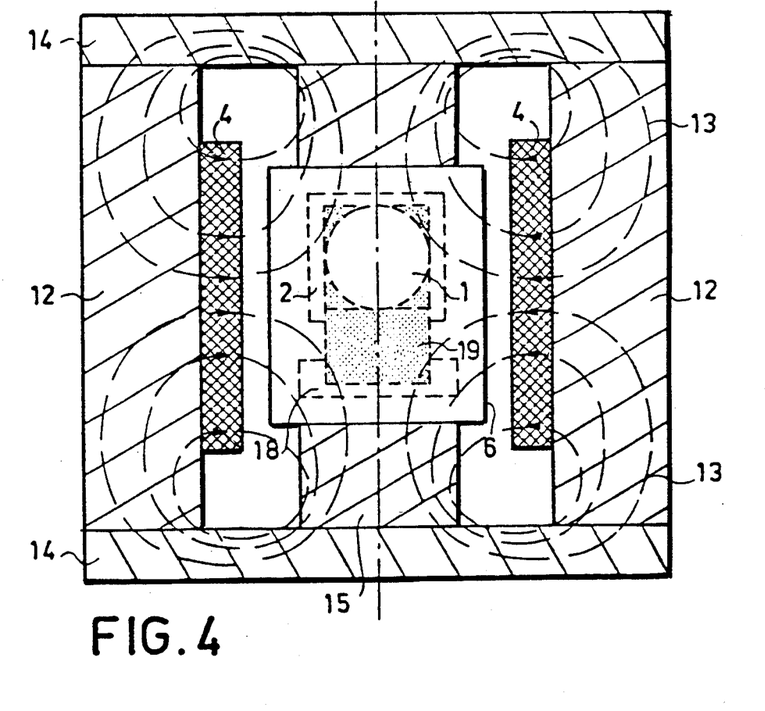

FIGS. 3 and 4 illustrate the driving portion of the access and radial actuator but its suspension has been omitted.

FIG. 3 is a diagrammatic sectional view in which is again shown the objective lens located on the focusing actuator, the central core 15 of the access and radial actuator, the right-hand and left-hand magnets 4 and finally the pole-pieces 12 of said actuator. The corresponding coil is shown at 6.

The same elements are illustrated in FIG. 4 which is a top view of the device. The magnetic field lines are shown at 13. The bars 14 serve to close the field at the ends of said actuator. The focusing actuator which is fitted with the coil 2 and to which the objective lens 1 is coupled is joined to said actuator by means of at least one flexible blade spring 19 inserted in a support bracket 18 which is rigidly fixed to the coil 6 of said actuator. Said coil 6 performs the function of the aforementioned coils 3 and 6 of FIG. 2.

Figure 5:
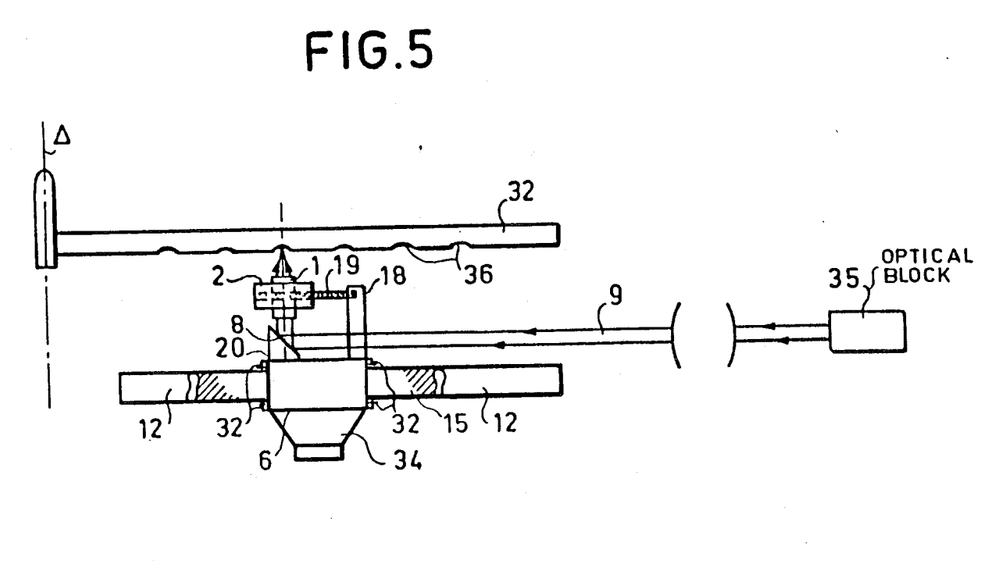

FIG. 5 illustrates said access and radial actuator portion which is incorporated in the complete device for recording and reading of the disk. In the exploded view of the figure, there are therefore again shown the central core 15 and the pole-pieces 12 of said actuator as well as the focusing actuator comprising the coil 2. The focusing actuator to which the objective is attached is coupled by means of a flexible blade spring 19 clamped in a support bracket 18 to the coil of the actuator mentioned earlier.

The disk 32 which is provided with at least one circular or spiral track is shown with grooves 36 and rotates about the axis Δ.

The optical unit 35 produces a collimated beam 9 which is reflected from the mirror 8 and focused on the track by the objective lens 1.

The coil 6 is illustrated in this case with small magnets 32 which provide magnetic lift with respect to the central core 15. A mass for balancing said coil 6 is shown at 34.

In order to simplify this figure, the magnetic focusing circuit shown at 10 in FIG. 2 has been omitted.

Figure 8:
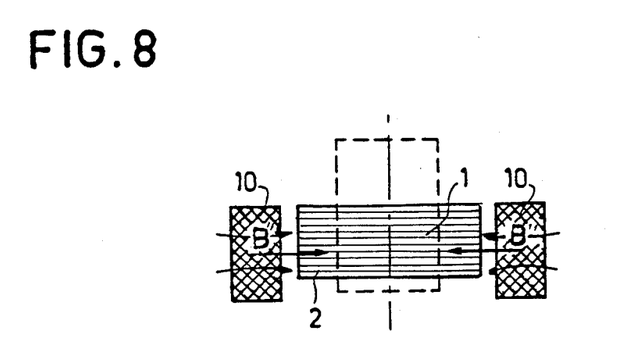
FIGS. 8 to 13 illustrate different particular aspects of the invention.
Figure 9:
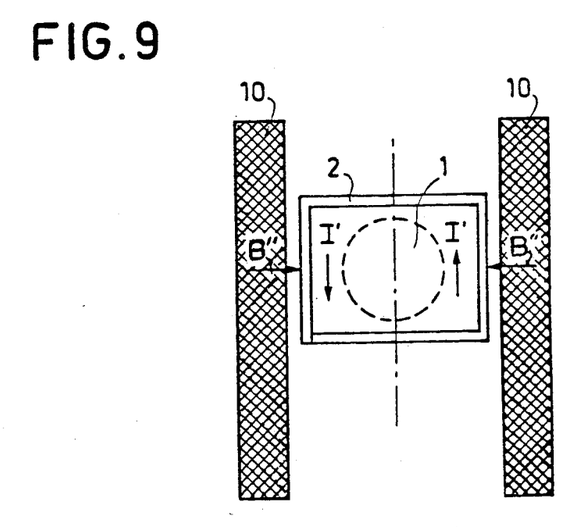
Figure 10:
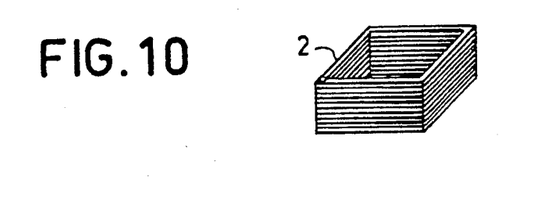

FIGS. 8, 9 and 10 illustrate the focusing actuator portion with a coil 2 and magnets 10 and an objective lens 1.

The focusing element fixed on the access and radial element is attached in a flexible manner in the direction of focusing (it has a low resonant frequency such as 30 Hz, for example). In the radial direction, this attachment must result in substantial stiffness and must have a high resonant frequency, the value of which exceeds the frequency band of the radial servomechanism, namely on the order of 5 to 10 kHz. This condition is obtained fairly easily with strips of material having a high modulus of elasticity, which work by bending for focusing and in compression-extension for radial tracking. High-frequency rejection of said resonance makes it possible to introduce the loop correction filter in a $\pi$ phase-shift zone. In fact, by introducing a phase lead of the resistor-capacitor type, for example, it is possible to obtain simply a servomechanism of the second degree.

An additional inertial mass is rigidly fixed on the access and radial tracking coil on the side opposite to that on which the focusing element is fixed. Said additional mass is shown at 34 in FIG. 5.

By reason of the fact that it is impossible to cause the center of application of the forces of the access and radial tracking coil to coincide perfectly with the center of gravity of the complete moving system (access and radial tracking coil, focusing device, additional inertial mass), the force of the radial tracking coil produces a pitching movement in addition to the movement of radial translation. In order to ensure that said pitching movement does not prevent the radial control loop from closing with a satisfactory gain, the center of force and the center of gravity of the moving system must be placed in such a manner as to ensure that the aforesaid pitching movement gives rise at the level of the disk to a movement in the direction of translational motion and in phase with this latter as far as possible. It is the intended function of the additional inertial mass 34 to permit this positioning of the center of gravity.

The additional inertial mass 34 must be chosen so as to have the smallest possible weight, thereby avoiding any excessive reduction in radial sensitivity of the system while nevertheless making it possible to position the center of gravity at the desired point. Said mass must therefore take the form of a rigid structure which is rigidly fixed to the radial tracking coil but with the greater part of its mass located at a distance from the coil.

Figure 6:
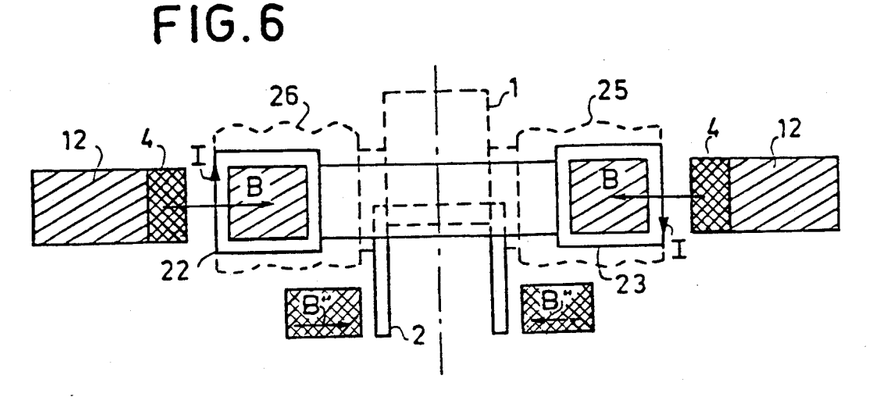
FIGS. 6 and 7 illustrate an alternative embodiment of the optical head in accordance with the invention.
Figure 7:
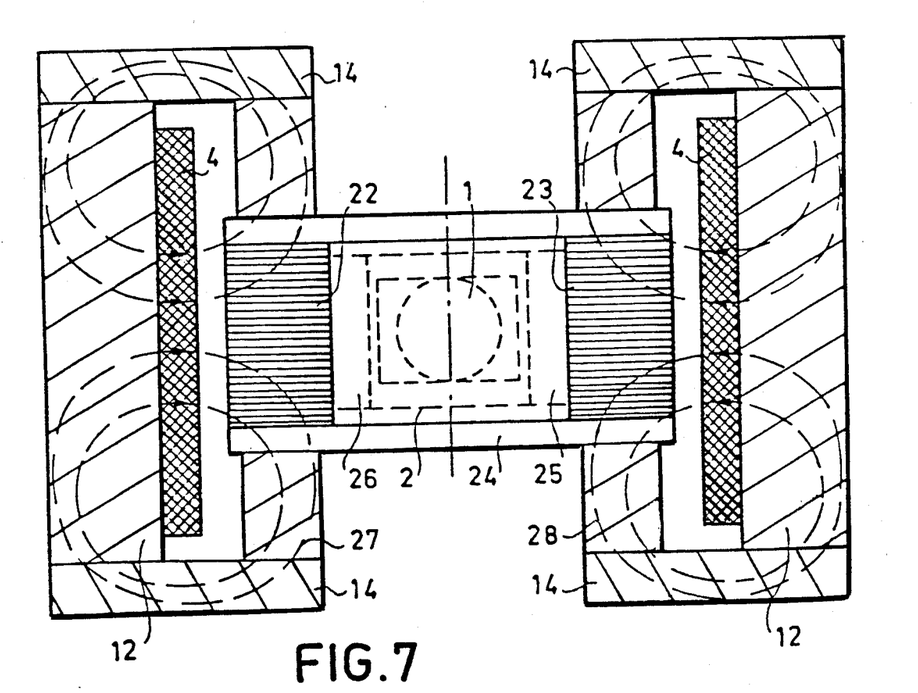

An alternative embodiment of the system of actuators for focusing, radial tracking and access is illustrated in FIGS. 6 and 7 which correspond respectively to FIGS. 3 and 4. In this case the radial and access actuator comprises two central cores 27 and 28 on which two coils 22 and 23 are guided. The reference numeral 24 designates a rigid framework for coupling the two radial coils 22 and 23.

Figure 11:
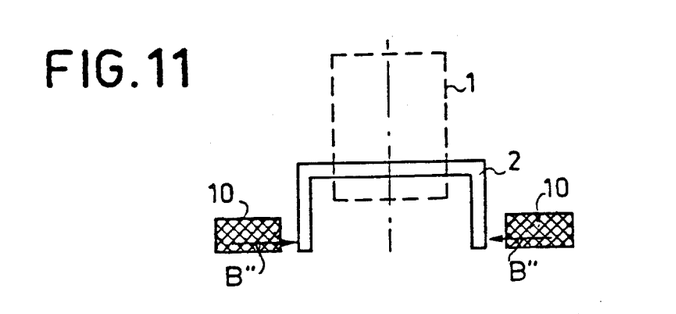
Figure 13:
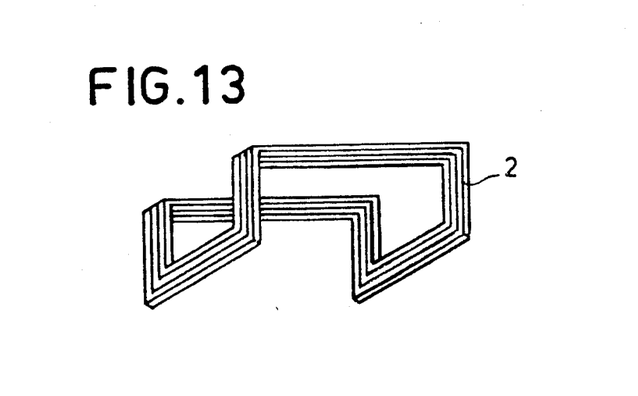

The other components of the radial actuator have remained the same and have been given the same reference numerals as in the previous figures. Thus there are again shown the pole-pieces 12, the magnets 4 as well as the objective lens 1. In this example, however, the focusing actuator is different. On the one hand, it is coupled to the two coils 22 and 23 by means of an elastic suspension shown at 25 and 26. On the other hand, the actuator is constituted by a coil 2 which is shown in FIGS. 11 and 13 and interacts with two magnets 10 shown in FIG. 11.

Figure 12:
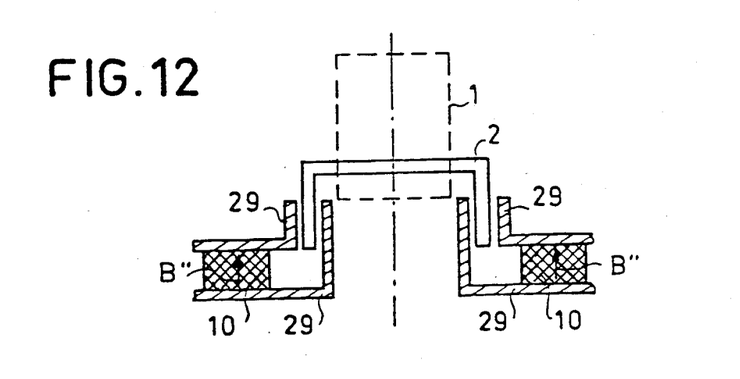

An alternative design of said focusing actuator is illustrated in FIG. 12 with pole-pieces 29 and magnets 10.

In order to carry out guiding of the moving head, the device in accordance with the invention utilizes the repulsion between two magnetic fields, which permits sustentation or lifting of said head.

Figure 14:
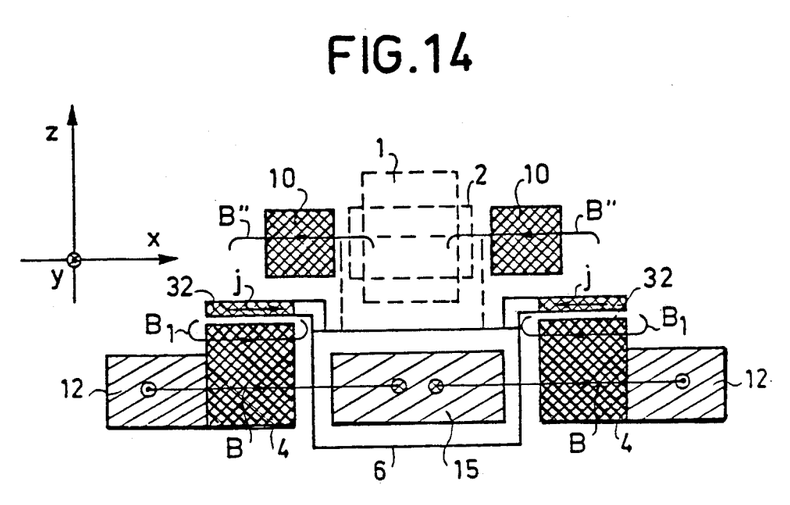
FIGS. 14 and 15 illustrate the device for guiding the optical head in accordance with the invention.

Consideration will accordingly be given to the device which is illustrated in FIG. 14.

Figure 15:
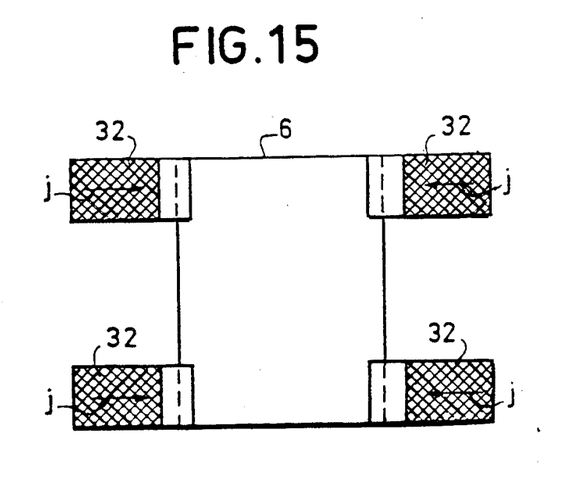

As shown in FIG. 14, the height of the magnets 4 of the basic magnetic circuit of the access and radial tracking actuator is increased without modifying its pole-pieces 12, the field within the pole-pieces is not disturbed (said field B continues to close on itself in the longitudinal direction, that is, at right angles to the right-section plane of the circuit) but there is added a field $B_1$ which closes on itself in a right-section plane of the circuit. If consideration is given to four magnets 32 which are polarized in the direction j as shown in FIGS. 14 and 15, there arise from the action of the field $B_1$ on the small magnets repulsion forces which tend to move these latter out of the field $B_1$ and to overcome the action of gravity. The magnets 10 forming the magnetic circuit of the focusing device are also illustrated in FIG. 14. If necessary, they would prevent excessive repulsion of the lower magnetic circuit.

By suitably arranging the different small magnets 32 so that they are rigidly fixed to the access and radial tracking coil, it is possible in principle to provide a guiding action both on the x-axis and on the z-axis and also to prevent interference by rolling, pitching and yawing movements.

However, if consideration is given to a conventional actuator, that is to say a loudspeaker voice coil without mechanical suspension as employed for focusing control in many optical disk readers, it is apparent that a lifting force alone acts in opposition to gravity and any solid friction forces in the orthogonal directions. The degree of accuracy of control which can be achieved by this device is nevertheless on the order of 0.1 micrometer.

It can therefore be conceded that there is no need to achieve perfect "omnidirectional" guiding of the access and radial tracking motor and that four small magnets 32 which are rigidly fixed to the access and radial tracking coil in the zone located above the main magnets permit sufficient guiding and lifting of the moving system without any excessive increase in weight. Taking into account the gradient of the field B both along z and along x, guiding is ensured in both directions. The fact of employing two pairs of magnets located at the ends of the radial coil as shown in FIG. 15 makes it possible to prevent the movements of rotation mentioned earlier.

Figure 16:
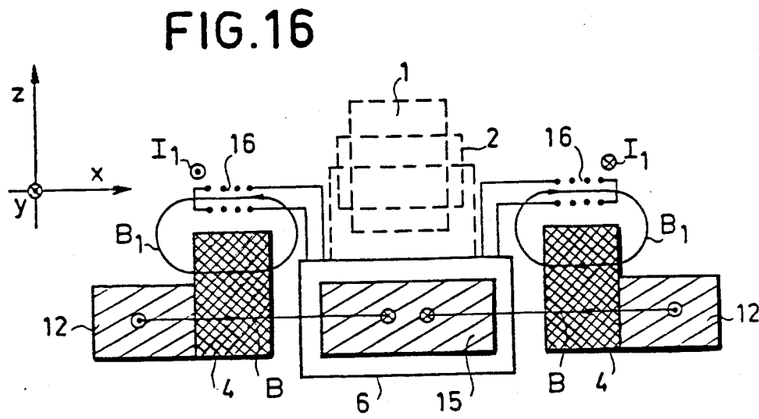
FIGS. 16 to 18 illustrate different alternative embodiments of said guiding device.
Figure 17:
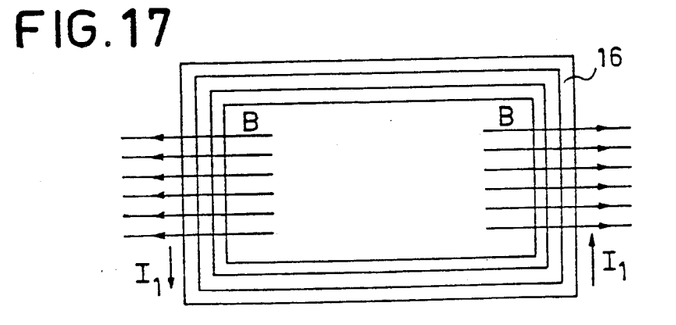

A variant of the principle of the device can be the interaction between the field $B_1$ of the magnet and the current $I_1$ of a coil 16 fixed on the access and radial tracking moving system as shown in FIGS. 16 and 17.

Figure 18:
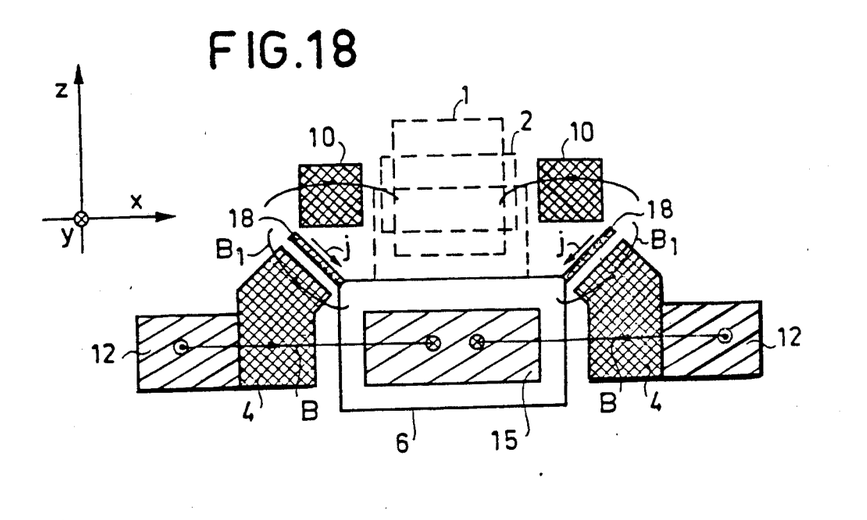

Should it none the less be found desirable to achieve enhanced accuracy of guiding along the axis x, it is possible to modify the external portion of the magnets of the access and radial tracking motor in accordance with the diagram of FIG. 18. Under these conditions, the repulsive force is equally divided between the directions x and z, the angle made by the direction common to the small magnets 18 and to the surface of the magnets 4 being approximately $\pi/4$ with respect to the vertical axis Oz.

Inasmuch as the focusing element is directly subjected to the focusing force, the response of its movement at high frequencies remains inverse to the square of the frequency in spite of the flexibility of the magnetic suspension. In consequence, no problem arises in regard to loop correction since the phase shift does not exceed $\pi$ at the highest frequencies.

The system described in the foregoing is particularly well suited to the case in which the recording and reading optical system is divided into two sections: a fixed section comprising the light sources and sensors, and a moving section or "optical head" comprising the actuators and the objective lens to which a reflecting mirror has to be added in order to return to the objective lens the beam which emerges from the fixed section and conversely to return to the fixed section of the optical system the beam which is reflected from the disk and issues from the objective lens. This is the case which has been chosen for describing the invention.

However, the device in accordance with the invention can be employed in a compact and simplified optical head which contains the entire optical system (especially in the case of a reader alone in which the optical layout can be highly simplified). In this case, the entire optical system is located on the access and radial tracking motor. In order to have a small weight, the objective employed for focusing on the disk can be provided in the form of an aspheric simple lens or a holographic lens.

The laser is a semiconductor laser and the optical elements are reduced to the smallest possible dimensions.

By way of example, the actuators hereinabove described can be controlled by the following electronic system:

Focusing may be carried out, for example, by circuits in which provision is made for proportional-plus-derivative correction and, if necessary, plus integration.

Tracking may be performed, for example, by circuits providing proportional-plus-integration-plus-derivative correction.

Access to the track of the disk can be obtained, for example, by means of a managed control unit with speed control by a microprocessor.

What is claimed is:

1. A device for optical scanning of a track arranged in a pattern of adjacent track elements lying in a reference surface of an optical readable data carrier, said device comprising:
    a movable optical head projecting in said reference surface a light spot for optical interaction with anyone of said track elements, said optical head including an objective lens respectively movable in a first direction normal to said reference surface and in a second direction transverse to said track elements;
    a mount for said objective lens;
    carriage means having a mechanical link with said mount to allow for displacement of said objective lens in said normal direction;
    supporting bench means for causing said carriage means to move along said transverse direction;
    fixed magnetic means for creating a stationary magnetic field having a direction perpendicular to said first and second directions, and
    first and second electrically conducting means subjected to said stationary magnetic field for respectively generating in response to the flow of appropriate control current first and second electrodynamic forces respectively oriented along said normal and transverse directions;
    said first electrically conducting means being fastened to said mount, and said second electrically conducting means being fastened to said carriage means;
    said carriage means comprising a set of magnetic field generator means cooperating with said fixed magnetic means to produce magnetic repulsive forces causing said carriage means to lift above said supporting bench means without any mechanical friction therewith.

2. A device as claimed in claim 1, wherein said fixed magnetic means comprises a magnetic circuit having a pair of first magnetic field emitting faces facing said carriage means and arranged symmetrically in relation with a plane parallel to said normal and transverse directions;
    each of said first magnetic field emitting faces facing a pair of said magnetic field generator means aligned along said transverse direction;
    said magnetic circuit further having a pair of second magnetic field emitting faces and there between at least one magnetic core delineating with said second magnetic field emitting faces two parallel air gaps symmetrically arranged in relation with said plane;
    said second electrically conducting means being portions of a coil surrounding said magnetic core.

3. A device as claimed in claim 2, wherein said magnetic circuit comprises between said second magnetic field emitting faces two magnetic cores symmetrically arranged in relation with said plane; said second electrically conducting means being portions of two coils respectively surrounding said two magnetic cores.

4. A device as claimed in claim 2, wherein said first magnetic field emitting faces are coplanar.

5. A device as claimed in claim 2, wherein said first magnetic field emitting faces are oblique in relation with said plane.

6. A device as claimed in claim 2, wherein said first electrically conducting means are arranged in supplementary parallel air gaps arranged symmetrically in relation with said plane, said carriage means being intermediate said objective lens and said supplementary parallel air gaps.

7. A device as claimed in claim 1, wherein said fixed magnetic means comprises:
    two pairs of magnetic field emitting faces symmetrically arranged in relation with a plane parallel to said normal and transverse directions, the faces of said pairs delineating two air gaps wherein said magnetic field generator means are arranged; and
    four additional magnetic field emitting faces d elineating four parallel air gaps symmetrically arranged in relation with said plane, said first electrically conducting means being arranged in a pair of said parallel air gaps and said second electrically conducting means being arranged in the remaining pair of said parallel air gaps.

8. A device as claimed in claim 7, wherein said parallel air gaps in which are arranged said first electrically conducting means are narrower than said parallel air gaps in which are arranged said second electrically conducting means.

9. A device as claimed in claim 1, wherein said first electrically conducting means comprise portions of a saddle shaped coil.

10. A device as claimed in claim 1, wherein said fixed magnetic means comprise permanent magnet means.

11. A device as claimed in claim 1, wherein said fixed magnetic field generator means are permanent magnets.

12. A device as claimed in claim 1, wherein said magnetic field generator means are coils wherein a current is flowing.

13. A device as claimed in claim 1, wherein said carriage means further comprise a mirror arranged to reflect along said normal direction a beam incident along said transverse direction.

14. A device as claimed in claim 13, wherein said beam is supplied from a fixed source of radiation.

* * * * *